United States Patent [19]

Prusow

[11] 4,431,250
[45] Feb. 14, 1984

[54] TEMPORARY POWER TAP WITH SLIDE MOUNTING

[75] Inventor: Leon W. Prusow, Scottsdale, Ariz.

[73] Assignee: Antronic Corporation, Scottsdale, Ariz.

[21] Appl. No.: 371,278

[22] Filed: Apr. 23, 1982

[51] Int. Cl.³ .............................................. H02B 1/06
[52] U.S. Cl. ........................... 339/125 R; 248/DIG. 6
[58] Field of Search ........... 339/119 R, 125 R, 122 R; 174/58, 70 C; 220/3.9, 3.92; 248/DIG. 6

[56] References Cited

U.S. PATENT DOCUMENTS 4,398,647  8/1983  Ackerman ................. 339/125 R X

FOREIGN PATENT DOCUMENTS 1115332  10/1961  Fed. Rep. of Germany ........ 174/58
800274   8/1958  United Kingdom .............. 174/70 C Primary Examiner—Eugene F. Desmond
Attorney, Agent, or Firm—McDougall, Hersh & Scott

[57] ABSTRACT

A temporary power tap is disclosed consisting of an enclosure having a plurality of electrical receptacles mounted therein. The enclosure is adapted to be temporarily mounted to a wall, work bench or other surface by means of a slide mounting arrangement. The slide mounting arrangement includes a T-shaped channel formed in the rear portion of the enclosure. The T-shaped channel is dimensioned to engage two or more screw heads which extend slightly above the surface to which the power tap is to be secured. The channel captures the screw heads therein securing the enclosure to the desired surface.

5 Claims, 4 Drawing Figures

TEMPORARY POWER TAP WITH SLIDE MOUNTING

BACKGROUND OF THE INVENTION

This invention relates to temporary power taps. Such devices are utilized in many environments. For example, a home owner who has a work shop may require a number of electrical receptacles to power various devices used. Often sufficient electrical receptacles are not available requiring the use of extension cords, adapters and the like. Such devices are not as safe as might be desired in that the receptacles are not enclosed within a properly insulated and secure junction box or enclosure. Further, it is highly desirable that the receptacles be fused or monitored by means of a circuit breaker to prevent overloading of a given circuit to which the receptacles may be connected.

Temporary power taps which, in general, consist of a metallic enclosure housing a number of receptacles fill this need. Such receptacles are fused or monitored by a circuit breaker to prevent the total current drawn by the temporary power tap receptacles from exceeding a specified maximum as, for example, 12 or 15 amps. In addition, a master power switch and pilot light can be provided to remind the user to de-energize the receptacles when they are not in use.

One problem encountered with the use of temporary power taps is the means for securing the power tap against unwanted and undesirable movement. By their very nature these power taps are not intended to be permanently secured to a surface. Further, in order to acquire listing by Underwriter's Laboratory and similar safety agencies, it is mandatory that these devices not be permanently mountable.

Accordingly, it is necessary to provide a temporary power tap which can be temporarily secured to a work surface but which also, when desired, can be rapidly removed therefrom.

It is known in the art to provide power taps having various temporary mounting means, such as brackets, which can engage a nail or screw extending from a surface. The brackets may be variously shaped as disclosed, for example, in U.S. Pat. Nos. 4,072,401 and 4,113,334. These arrangements, while satisfactory for some purposes, are not as neat in appearance as might be desired nor as secure as is required for some applications. Thus, for example, the bracket arrangements can and often do slip from their mounting when the receptacle is jostled while in use.

Accordingly, it is an object of the present invention to provide a temporary power tap with a quick and easy mounting arrangement which is both secure during use and easy to remove when it is desired to do so.

It is a further object of the invention to provide a slide mounting arrangement for a temporary power tap which is secure and easily installed by the user.

A further object of the invention is to provide a temporary power tap enclosure having a channel integral therewith by which the enclosure can be temporarily mounted to a work surface.

Other objects and advantages of the invention will be apparent from the remaining portion of the specification.

DETAILED DESCRIPTION

Figure 1:
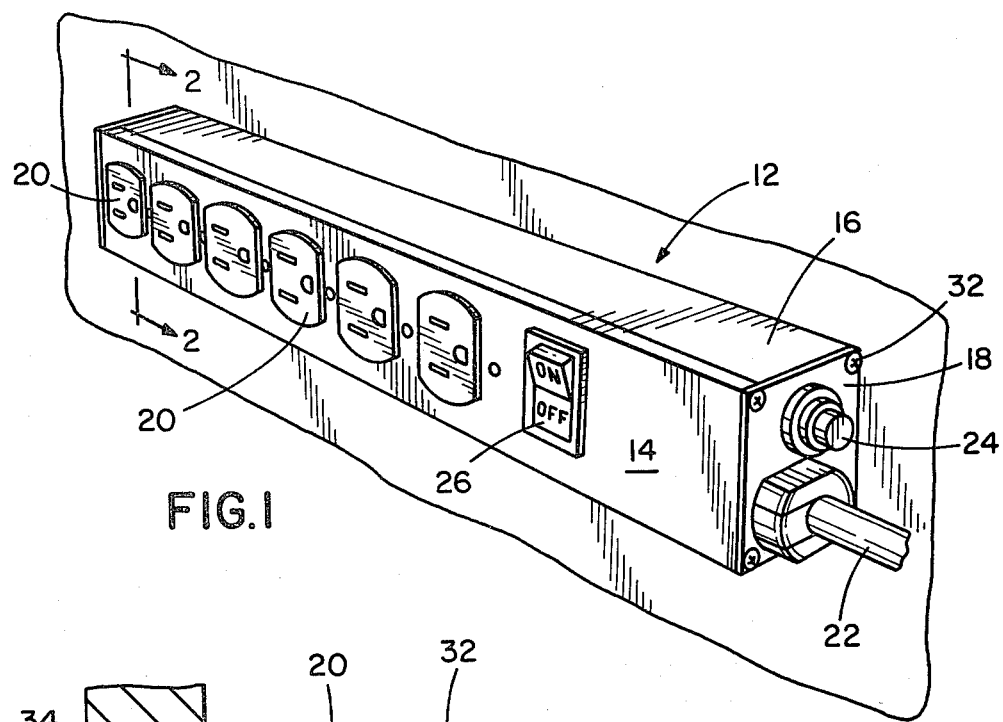
FIG. 1 is a perspective view of a temporary power tap according to a preferred embodiment of the invention.

Referring to FIG. 1, a temporary power tap 10 is illustrated. The temporary power tap includes an enclosure, preferably in the form of a metallic box. The enclosure may be formed of a front plate 14 and a generally U-shaped member 16 which mates with the front plate to form a generally rectangular enclosure. The ends of the enclosure are sealed off by end plates 18 and 20 thereby forming a safe enclosure to house electrical receptacles 21.

According to a preferred embodiment of the invention a plurality of such receptacles 21 are mounted to the front plate 14 at spaced intervals therealong. The receptacles are typically wired in parallel and are supplied, via a power cord 22, with electric power from a conventional wall outlet. Electrically connected intermediate the receptacles and the power cord is a circuit breaker 24 or fuse of conventional manufacture. Also provided is a master power switch 26 which serves to disconnect the receptacles from the source of current when desired.

The actual electrical connection of the receptacles, power switch and circuit breaker form no part of the present invention. Details concerning this connection can be obtained, for example, in U.S. Pat. Nos. 4,072,401 and 4,113,334.

As mentioned in the background portion of the specification, power taps of the type illustrated in FIG. 1 serve the purpose of providing a number of additional receptacles where only one or two such receptacles would otherwise be available. The temporary power taps, by virtue of being enclosed in an insulated and grounded enclosure 12, provide a safe device whereby the additional receptacles desired by a workman can be provided. In order to comply with the local codes and with the safety standards set down by laboratories, such as Underwriter's Laboratory, it is necessary that such power taps not be permanently mounted to a work surface. It is permitted, however, that such power taps can be of the temporary mounting type, that is, they can be readily de-mounted from the work surface when desired.

Figures 2, 3:
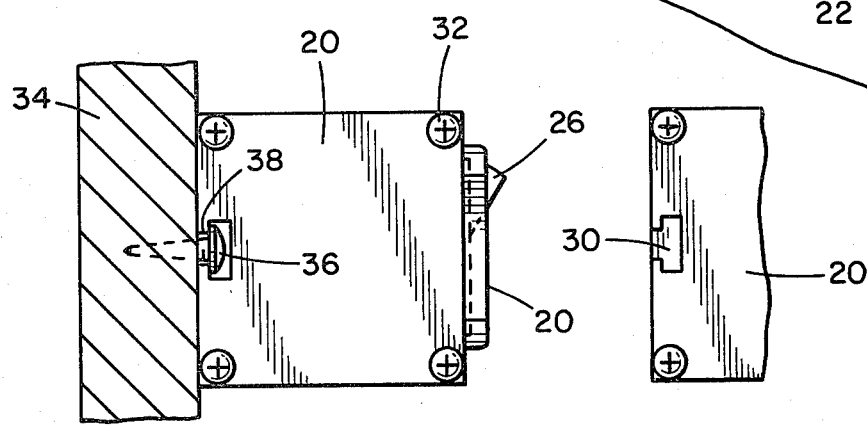
FIG. 2 is a side elevational view of the power tap mounted to a work surface by use of the slide mounting according to the invention.
FIG. 3 is a partial side elevational view showing the T-shaped channel integral with the enclosure.
Figure 4:
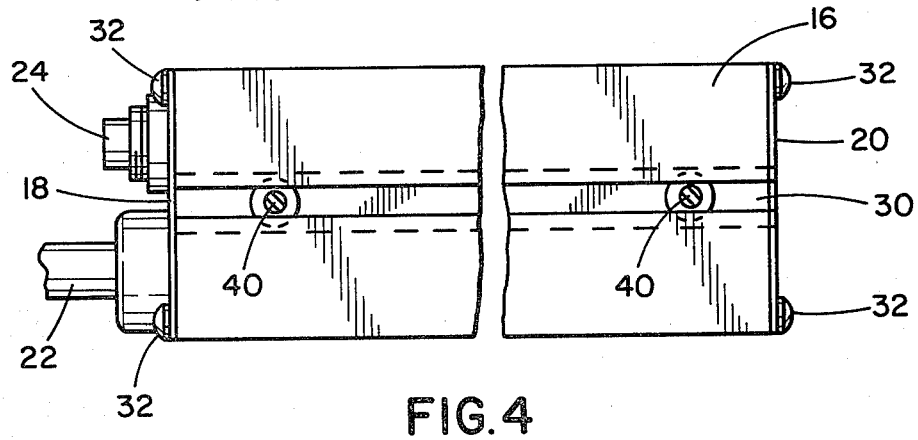
FIG. 4 is a rear elevational view having portions thereof cut away illustrating the slide channel.

With reference to FIGS. 2 through 4, a slide mounting arrangement according to the present invention is disclosed. This mounting arrangement accomplishes the requirements of being temporary in nature, secure when mounted and yet permitting rapid de-mounting when desired. According to a preferred embodiment the mounting consists of a T-shaped channel 30 integrally formed in the rear portion of the U-shaped enclosure 16. One end of the T-shaped channel 30 is sealed or covered by the end plate 18. The other end plate 20 does not cover the channel 30. Instead it is provided with a mating aperture or channel therethrough thereby to permit access to the channel. As best illustrated in FIGS. 2 and 4, the end plates are secured to the U-shaped member 16 by means of screws or rivets 32.

The mounting arrangement utilizes at least two screws, nails or other common fasteners to secure the enclosure to a work surface. This is best illustrated in FIG. 2 in which a work surface 34, such as, a wall, work bench or the like, has a pair of fastening devices 36 therein. The fastening devices are not completely flush with the work surface 34 but rather extend above the surface by a distance slightly greater than the height of the base portion 38 of the T-shaped channel 30. The fasteners are aligned, if more than two are utilized. When it is desired to temporarily mount the power tap it is merely necessary to slide the enclosure along the work surface 34 so as to capture the fasteners 36 in the T-shaped channel.

In the embodiment illustrated in FIG. 1 the enclosure 12 slides to the left so that the opening through the end plate 20 permits the fasteners to be received in the T-shaped channel 30. When the enclosure has been completely disposed over the fasteners the rightmost fastener will strike the end plate 18 preventing further sliding movement and signalling the user that the power tap is completely installed and may now be energized and used.

In the installed position the base portion 38 of the channel bears against the head portion of the fastener 36 to secure the enclosure against the work surface. This mounting arrangement has the advantage that the enclosure is mounted flush against the work surface, is tightly held by the arrangement and is, therefore, neat and safe in use. If the mounting is not sufficiently secure this can be easily rectified by reducing the distance by which the fastener 36 extends above the work surface 34 until a tight fit between the base portion 38 and the fastener head is attained. When properly installed, therefore, the power tap will be securely held by the mounting arrangement almost as if in a permanent installation.

Nevertheless, when it is desired to de-mount the temporary power tap, the steps indicated in mounting it need only be reversed to quickly and easily remove the power tap from the work surface. Specifically, the power tap is moved to the right, as viewed in FIG. 1, releasing the fasteners from the channel through the end plate 20. When the last fastener is released from the channel the enclosure can be removed from the work surface, stored, moved to another location or otherwise disposed of.

As indicated in FIG. 4, the rear portion of the enclosure 16 can be joined to the front plate 14 by means of screws or rivets 40 which, in a preferred embodiment, are accessible through the channel 30.

While I have shown and described embodiments of this invention in some detail, it will be understood that this description and illustrations are offered merely by way of example, and that the invention is to be limited in scope only by the appended claims.

I claim:

1. A power tap which can be temporarily secured to a work surface by a common fastening device, such as a screw, comprising:
    an enclosure formed in two sections, a first section adapted to mount a plurality of electrical receptacles thereon, a second section adapted to mate with said first section to enclose said receptacles,
    a pair of end plates disposed and secured at opposite ends of said enclosure,
    a plurality of receptacles mounted to said first section and electrically connected to a power cord for energizing said receptacles,
    said second section having a portion thereof configured to form a T-shaped channel extending from one end plate to the other, said channel including a base portion and a head portion, the base portion dimensioned to receive the shaft of a fastening device therein, the base portion of said channel terminating in said head portion, the head portion dimensioned to receive the head of said fastening device, the base portion of said channel bearing against the underside of the head of said fastening device thereby to capture the fastening device in the channel and secure the power tap to the work surface,
    one of said end plates having a T-shaped opening therein substantially identical in dimension to said T-shaped channel and located at one end of said channel adapted to permit fasteners to enter said channel for mounting purposes and be withdrawn from said channel to de-mount the power tap,
    the other of said end plates having no opening therein and serving to close off the other end of the channel.

2. The power tap according to claim 1 wherein said enclosure is rectangular in cross-section and said channel and receptacles are on opposite sides.

3. The power tap according to claim 1 wherein said power tap includes means to limit the total current supplied to the receptacles.

4. The power tap according to claim 1 wherein said channel is formed inwardly of the outer surface of said second section whereby the enclosure mounts flush against the work surface.

5. The power tap according to claim 1 wherein said first and second sections are secured to form said enclosure by means of fasteners connecting the sections together, said fasteners being disposed in and accessible from said channel.

* * * * *